United States Patent Office 3,769,281
Patented Oct. 30, 1973

3,769,281
DEBLOCKING PROCESS FOR CEPHALOSPORIN ANTIBIOTICS
Robert R. Chauvette, Indianapolis, Ind., assignor to Eli Lilly and Company, Indianapolis, Ind.
No Drawing. Filed July 9, 1970, Ser. No. 53,646
Int. Cl. C07d 99/24
U.S. Cl. 260—243 C                               8 Claims

ABSTRACT OF THE DISCLOSURE

In the preparation of cephalosporins (like cephalexin) containing an amino function that is protected during acylation by a tertiary-butoxycarbonyl group, the protecting group is removed by treatment of the acylation product with paratoluenesulfonic acid monohydrate in acetonitrile, nitromethene, or chloroform.

INTRODUCTION

This invention relates to processes for the manufacture of cephalosporin-type antibiotics. More particularly, this invention provides an improvement in the process of manufacturing cephalosporin substances in which a free-amino group must be protected during one or more of the several chemical steps that are used in the manufacturing process, and which amino-protecting group must thereafter be removed in the course of manufacturing the cephalosporin antibiotic substances. For example, in the manufacture of cephalexin, which is the generic name for 7-(D-α-amino-α-phenylacetamido - 3-methyl-Δ³-cephem-4-carboxylic acid, 7-amino-3-methyl-Δ³-cephem-4-carboxylic acid, also referred to as 7-aminodesacetoxycephalosporanic acid, and abbreviated 7-ADCA, is acylated on the 7-amino-nitrogen with an acylating form of D-α-phenyl-glycine during which reaction the glycine amino group must be protected and then the protecting group must later be removed by subsequent treatment in manufacturing of cephalexin. Similar amino-protecting operations, and protecting group removal steps are necessary in the manufacture of cephaloglycin, 3-methoxymethyl-7-[D-α-amino-α-phenylacetamido] - Δ³-cephem-4-carboxylic acid, 3 - methylthiomethyl-7-[D-α-amino-α-phenylacetamido]-Δ³-cephem-4-carboxylic acid, and the like.

DESCRIPTION OF THE PRIOR ART

Literature conditions for removing the N-blocking group from N-tert-butoxycarbonyl amino group containing cephalosporins have included the use of formic acid (98 percent formic acid or various aqueous dilutions of formic acid) at room temperature to reflux temperatures for several hours. However, the yields of the free amino group containing cephalosporin product by that procedure have been lower than desired, and the products have been in poor quality.

The use of strong acid conditions such as hydrogen bromide or hydrogen chloride in acetic acid or in diethyl phosphate, J. Am. Chem. Soc., 79, 6180–6183 (1957), has been suggested for use in removing tert-butoxycarbonyl groups in peptide synthesis, but this technique is not useful with cephalosporins as they result in decomposition via opening of the β-lactam ring. C. W. Ryan et al. in the J. Med. Chem., 12, 310–313 (1969) disclose the use of cold trifluoroacetic acid to remove tert-butoxycarbonyl protecting groups in the synthesis of cephalexin. However, the use of such acid results in the formation of the trifluoroacetate salt of cephalexin, which is precipitated and needs to be converted to cephalexin by removal of the trifluoroacetate anion in an added step. Furthermore, the yields of cephalexin by that process are poorer than desired, and trifluoroacetic acid is both expensive and toxic which limit its use in a manufacturing process.

U.S. Pat. 3,062,804 suggests the use of various strong acids, including p-toluenesulfonic acid, for the removal of amine masking tertiary-butoxycarbonyl radicals from peptides. The examples thereof suggest the removal of the N-tertiary-butoxycarbonyl protecting groups from the peptides by treating the N-protected peptides with anhydrous hydrogen bromide or anhydrous hydrogen chloride, bubbled into a suspension of the amine-masked peptide in nitromethane for five minutes, and then allowing the reaction mixture to stand for three hours, or by the use of hydrogen chloride in acetic acid. However, such drastic conditions cannot be used in removing tert-butoxycarbonyl mask groups from amino containing cephalosporin compounds without disrupting the β-lactam structure and thereby ruining the recovery of the desired amino-containing cephalosporin antibiotic. There is thus a need for a practical process to remove tert-butoxycarbonyl protecting groups from amino-containing cephalosporin compounds which will be useful in the overall synthesis of cephalosporin antibiotic compounds.

An object of this invention is to provide a process which can satisfy that need.

A more specific object of this invention is to provide an improvement in yield to processes for the semi-synthetic production of amino group containing cephalosporin antibiotics.

SUMMARY OF THE INVENTION

According to this invention N - tert - butoxycarbonyl amino-protecting groups in cephalosporin type compounds are removed by treating the N-(tert-butoxycarbonyl) amino-protected cephalosporanic acid or ester derivative, dissolved in an organic liquid medium containing acetonitrile with a $C_1$ to $C_{12}$-alkylsulfonic acid or a $C_6$ to $C_{12}$-aromatic sulfonic acid, e.g., methanesulfonic or p-toluene-sulfonic acid.

DETAILED DESCRIPTION OF THE INVENTION

This invention provides an improved process for removing tert-butoxycarbonyl protecting groups from amino group containing cephalosporanic acids and esters. By this invention, the chemical and physical conditions needed to remove tert-butoxycarbonyl protecting groups from amino nitrogens while preserving the essential beta-lactam of a cephalosporin antibiotic have been discovered. The invention thus provides process conditions for one of a series of steps in an overall process of preparing free amino group containing cephalosporin type antibiotics.

In the improved process of this invention a sulfonic acid is commingled with the N-(tert-butoxycarbonyl) blocked cephalosporanic acid or ester derivative dissolved in anhydrous solvent acetonitrile or organic liquid mixtures containing optimum proportions of acetonitrile.

The N-tert-butoxycarbonyl amino containing cephalosporanic acids or esters have the general formula

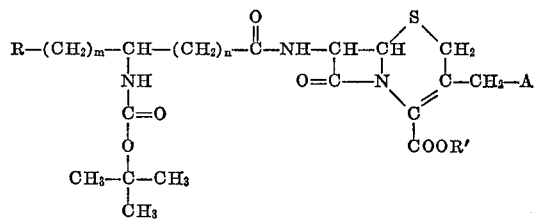

where R is phenyl, phenyl substituted with non-interfering substituents such as methyl, ethyl, —NO$_2$, —OH, —CONH$_2$, trifluoromethyl and the like,

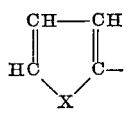

where

X is oxygen or sulfur, and the 3-isomers of such groups,
R' is hydrogen, or an ester group, such as 2,2,2-trichloro-ethyl, tert-butyl, benzhydryl, p-nitrobenzyl, p-methoxybenzyl, or the like, and
A is hydrogen, $C_1$ to $C_4$-alkanoyl, or —Y—($C_1$ to $C_3$)-alkyl where Y is oxygen or sulfur, or the like,
and $m$ and $n$ are each integers of from 0 to 4.

In this medium, a soluble sulfonic acid salt of the de-blocked amino-group containing cephalosporanic acid or ester is formed. The free amino-group containing cephalosporanic acid as the zwitterion or amino ester can be regenerated from the salt by diluting the organic solution with a little water, preferably with from 10 to 30 percent by volume of water, and treating the diluted salt solution with sufficient base to adjust the pH of the aqueous/organic medium to the isoelectric point to precipitate the free amino group containing cephalosporanic acid derivative. The free amino group containing cephalosporin ester can be obtained by evaporating the organic medium to a concentrated volume, and the residue can be dissolved in an organic solvent such as ethyl acetate, and the solution can be worked with aqueous base solutions such as 5 percent sodium bicarbonate in water, and then with water to remove impurities. The organic solvent can then be dried with chemical drying agents and removed under reduced pressure. The free amino-group containing cephalosporin ester residue can then be used directly in further chemical reactions to remove the ester group.

The temperature of the reaction mixture may vary widely but room temperature is sufficient to accomplish the purpose of this process.

According to this invention, N-(tert-butoxycarbonyl)-amino-protecting groups in cephalosporin-type compounds are removed by treating the N-(tert-butoxycarbonyl) amino-protected cephalosporanic acid or ester, dissolved in an organic liquid medium containing acetonitrile with a $C_1$ to $C_{12}$ alkyl or aromatic carbon sulfonic acid, e.g., methanesulfonic or p-toluenesulfonic acid. The temperature of the mixture may vary widely but room temperature is sufficient. At least a molar equivalent amount of the sulfonic acid is used, preferably two molar equivalents, relative to the tertbutoxycarbonyl group content is used to insure complete reaction. In this medium, a soluble, strong acid salt of the de-blocked amino group containing cephalosporanic acid or ester is formed. The mixture is diluted with some water and the free amino-group containing cephalosporin, as zwitterion or amino ester, may be regenerated from the salt by treating the salt with sufficient base, e.g., a tertiary amine such as tris($C_1$ to $C_6$-alkyl)amine or an inorganic base such as (NH$_4$)HCO$_3$, NH$_4$OH, to adjust the pH of the aqueous acetonitrile to the isoelectric point to precipitate the free amino-group containing cephalosporin as a zwitterion, or for extracting amino-group containing cephalosporin ester into an organic solvent.

The strong acid used in the process of this invention can be any sulfonic acid having a pKa of less than 4 that effects removal of the tert-butoxycarbonyl group in acetonitrile without degrading the cephalosporin. Simple $C_6$ to $C_{12}$-aromatic sulfonic acids such as p-toluenesulfonic acid monohydrate and other alkylbenzenesulfonic acids wherein the alkyl group contains from 1 to 18 carbon atoms, preferably 1 to 4 carbon atoms are preferred. Other sulfonic acids which may be used include the $C_1$ to $C_{12}$-alkanesulfonic acids such as methanesulfonic acid, ethanesulfonic, propanesulfonic, tert-butylsulfonic, heptanesulfonic, decanesulfonic, dodecanesulfonic acids, as well as sulfonic acids of the same carbon atom range containing non-interfering substituents.

The free-amino group containing cephalosporanic acid may be recovered from the acid addition salt by diluting the acetonitrile solution thereof with water, and adjusting the pH of the solution by means of a base to around 4 to 5, that is, the isoelectric point of the amino group containing cephalosporin acid, as measured directly on the solution with a glass electrode. The base used to precipitate the free amino group containing compound is conveniently a tertiary organic amine or a concentrated aqueous solution of an inorganic base such as ammonia or ammonium bicarbonate.

This process improvement finds particular utility as part of the production sequence of steps used in the manufacture of amino group containing cephalosporin antibiotics. In such production, the cephalosporin nucleus compound, e.g., 7-aminocephalosporanic acid (7-ACA), 7 - aminodesacetoxycephalosporanic acid (7 - ADCA), 7-amino-3-methoxymethyl-3-cephem-4-carboxylic acid, or a salt or ester form of such an acid is acylated with an acylating form of a selected amino acid such as D-α-phenylglycine, ring substituted phenylglycine, or other amino acid known to contribute to antibiotic activity to the resulting cephalosporin. Prior to acylation, the amino group has been protected with a tertiary-butoxycarbonyl group by known methods. When the acylation step is completed, the acylated 7-ACA, or 7-ADCA, or other cephalosporin nucleus acid, or ester form thereof may be treated first according to the process of this invention to remove the tert-butoxycarbonyl group, or if desired, the acylated product may be treated to remove any ester group by known methods prior to treatment according to this invention to remove the tertiary butoxycarbonyl group.

The invention is more specifically exemplified by the following example, showing the application of this invention and the process of preparing cephalexin, a known antibiotic. But it is to be understood that this invention may likewise be used in processes for preparing other amino group containing cephalosphorin compounds, important examples of which are cephaloglycin,
3-methoxymethyl-7-[D-α-amino-α-(3'-hydroxyphenyl)-acetamido]-3-cephem-4-carboxylic acid,
3-methylthiomethyl-7-[D-α-amino-α-phenylacetamido]-3-cephem-4-carboxylic acid,
3-methyloxymethyl-7-[D-α-amino-α-2-thienylacetamido]-3-cephem-4-carboxylic acid,
3-methoxymethyl-7-[D-α-amino-α-phenylacetamido]-3-cephem-4-carboxylic acid, and the like.

EXAMPLE 1

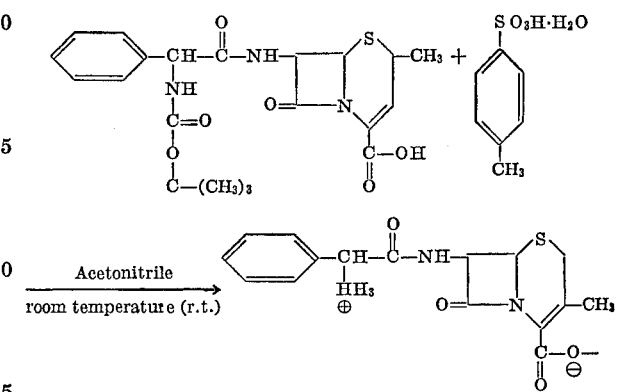

7 - [N-(t-butoxycarbonyl)-D-α-phenyl-glycylamido]-3-methyl-3-cephem-4-carboxylic acid, crude (from a 10 mm. run of its preparation) was dissolved in 50 ml. of acetonitrile and treated with 3.8 g. (20 mM.) p-toluenesulfonic acid monohydrate. The reaction solution was stored at room temperature overnight. The solution was cooled for addition of 10 ml. of water and triethylamine to pH 4.8. An immediate precipitation of cephalexin was observed. The product was filtered, washed with cold acetonitrile and dried to constant weight in a vacuum desiccator. The yield of cephalexin was calculated to be about 80 percent.

*Analysis.*—Calcd. for $C_{16}H_{17}N_3O_4S$ (percent): C, 55.33; H, 4.93; N, 12.10. Found (percent): C, 55.19; H, 5.19; N, 11.95.

Infra-red, ultraviolet and nuclear magnetic resonance spectra were consistent with that of cephalexin.

EXAMPLE 2

Part A 2,2,2 - trichloroethyl 7 - (D-α-phenylglycylamido)-3-methyl-3-cephem-4-carboxylate:

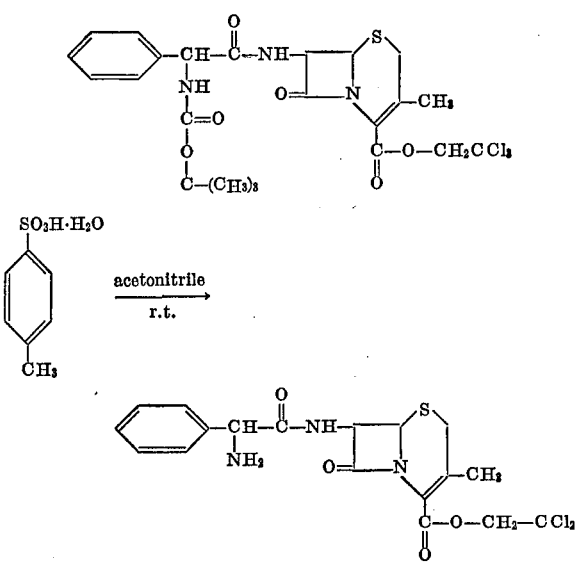

Crude, 5.0 g. (8.6 mM.) 2,2,2-trichloroethyl 7-[N-(t-butoxycarbonyl)-D-α-phenylglycylamido] - 3 - methyl-3-cephem-4-carboxylate, was dissolved in 40 ml. of acetonitrile containing p-toluenesulfonic acid monohydrate, 4.1 g. (21.5 mM.) and stored at room temperature overnight. The solvent was removed in vacuo. The residue contained no starting material as observed in thin-layer chromatography. The residue was dissolved in 100 ml. of ethyl acetate, cooled, and washed successively with 5 percent $NaHCO_3$ solution and water. The ethyl acetate solution was dried and evaporated in vacuo. The residue weighed 3.8 g. and was used directly in the ester reductive cleavage step following.

In an identical preparation, the product, 2,2,2-trichloroethyl ester of cephalexin, was purified for characterization by crystallization from ethyl acetate, M.P. 150°.

*Analysis.*—Calcd. for $C_{18}H_{18}Cl_3N_3O_4S$ (percent): C, 45.15; H, 3.79; N, 8.78. Found (percent): C, 45.10; H, 4.07; N, 8.68.

Infra-red and nuclear magnetic resonance spectra and electrometric titration were consistent with expected structure.

Part B

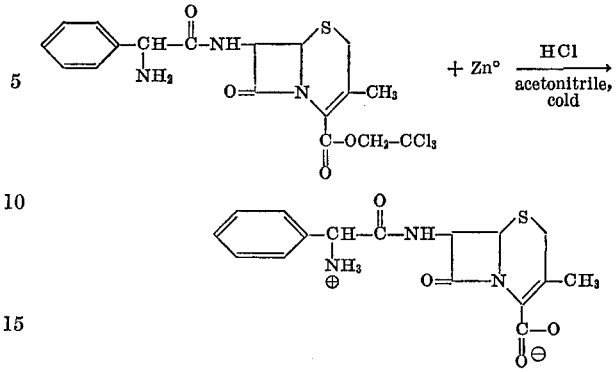

2,2,2 - trichloroethyl 7-(D-α - phenylglycylamido)-3-methyl-3-cephem-4-carboxylate, crude, obtained from the above reaction was redissolved in 40 ml. of acetonitrile and 6 ml. of water and stirred for 90 minutes in the cold with 1.2 g. (18.4 mM.) zinc dust, and 2 ml. of concentrated hydrochloric acid. The mixture was then filtered and the filtrate was adjusted to pH 4.5 with concentrated ammonium hydroxide. A white, crystalline precipitate developed. This was filtered, washed with acetonitrile and vacuum dried. Weight: 2.5 g. Thin-layer chromatography (using acetonitrile-water, 4:1 system) and a nuclear magnetic resonance spectrum of this material showed cephalexin as the major product.

I claim:

1. A process for removing the tert-butoxycarbonyl group in a cephalosporin compound of the formula

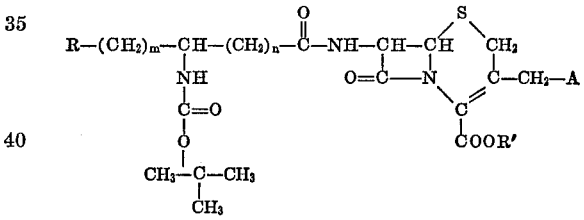

which comprises reacting said cephalosporin compound in acetonitrile with a $C_1$–$C_{12}$ alkyl sulfonic acid or a $C_6$ to $C_{12}$ aromatic carbocyclic sulfonic acid to form an amino cephalosporin compound of the formula

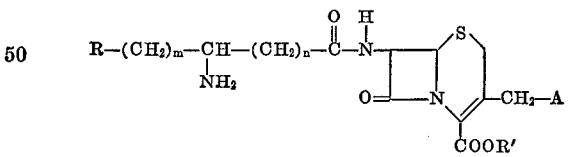

wherein

R is phenyl; phenyl substituted with —$CH_3$, —$C_2H_5$, —OH, $NO_2$, or —$CF_3$; 2-thienyl or 3-thienyl; 2-furyl or 3-furyl;

R' is hydrogen or 2,2,2-trichloroethyl, tert-butyl, benzhydryl, p-nitrobenzyl, p-methoxybenzyl;

A is hydrogen, $C_1$ to $C_4$-alkanoyl, or —Y—($C_1$ to $C_3$) alkyl where Y is oxygen or sulfur; and m and n are each integers of from 0 to 4.

2. A process as defined in claim 1 which further includes the step of separating the amino acid or ester from the salt ions formed with the sulfonic acid by treating the amino group containing cephalosporanic acid or ester salt with sufficient base to form the amino acid as a zwitterion or as an amino ester.

3. A process as defined in claim 1 wherein 7-[N-(tert-butoxycarbonyl)-D-α-phenylglycylamido] - 3 - methyl-3-cephem-4-carboxylic acid or ester thereof is treated with p-toluenesulfonic acid in acetonitrile to form the p-toluenesulfonic acid salt of cephalexin or an ester thereof.

4. A process as defined in claim 3 wherein the cephalexin salt is treated with a sufficient amount of a $C_1$ to $C_6$-trialkylamine or inorganic base to form the cephalexin as the zwitterion or as a free amino ester.

5. A process as defined in claim 1 wherein 7-[α-D-(N-tert - butoxycarbonyl)phenylglycylamido]-3-acetoxymethyl-3-cephem-4-carboxylic acid or ester is treated with p-toluenesulfonic acid monohydrate in the presence of acetonitrile to form the 7-[α-D-phenylglycylamido]-3-acetoxymethyl-3-cephem-4-carboxylic acid or ester salt with p-toluenesulfonic acid.

6. A process as defined in claim 3 wherein 7-[N-(tert-butoxycarbonyl) - D - α - phenylglycylamido]-3-methyl-3-cephem-4-carboxylic acid is treated with para-toluenesulfonic acid monohydrate in acetonitrile to form cephalexin, p-toluenesulfonic acid salt, and then treating the resulting salt with sufficient triethylamine to form the cephalexin as the zwitterion.

7. In a process for preparing an amino group containing cephalosporin compound of the formula

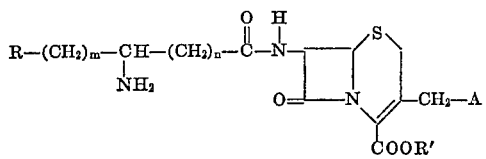

wherein
R is phenyl, phenyl substituted with $CH_3$, $-C_2H_5$, $-OH$, $NO_2$ or $-CF_3$, 2-thienyl, 3-thienyl, 2-furyl, or 3-furyl;
R' is hydrogen, 2,2,2-trichloroethyl, tert-butyl, benzhydryl, p-nitrobenzyl or p-methoxybenzyl;
A is hydrogen, $C_1$-$C_4$-alkanoyloxy or $-Y-(C_1-C_3)$ alkyl where Y is oxygen or sulfur; and
m and n are integers of from 0 to 4;

which comprises acylating a 7-aminocephalosporin nucleus compound of the formula

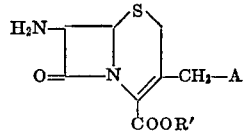

wherein R' and A are as defined above, with an N-protected glycine derivative to form a 7-(N-protected amino) glycylamido-cephalosporin, and thereafter removing the N-protecting group, the improvement which comprises acylating said 7-aminocephalosporin nucleus with an N-(tert-butoxycarbonyl) protected glycine derivative to form the 7-(N-tert-butoxycarbonyl-glycylamido)cephalosporin, and removing the tert-butoxycarbonyl group by reacting said 7-(N-tert - butoxycarbonyl - glycylamido) cephalosporin in the presence of acetonitrile with a $C_1$-$C_{12}$ alkyl sulfonic acid or a $C_6$ to $C_{12}$ aromatic carbocyclic sulfonic acid.

8. An improved process as defined in claim 7 wherein a 7-[N-(tert-butoxycarbonyl) - D - α-phenylglycylamido] derivative of 7-aminodesacetoxycephalosporanic acid or ester is treated with p-toluenesulfonic acid monohydrate in acetonitrile to remove the N-tert-butoxycarbonyl group.

References Cited
UNITED STATES PATENTS

| | | | |
|---|---|---|---|
| 3,062,804 | 11/1962 | Albertson | 260—112 |
| 3,352,858 | 11/1967 | Brast et al. | 260—243 C |
| 3,634,417 | 1/1972 | Attenburrow | 260—243 C |

NICHOLAS S. RIZZO, Primary Examiner

U.S. Cl. X.R.

260—239.1

PO-1050
(5/69)

UNITED STATES PATENT OFFICE
CERTIFICATE OF CORRECTION

Patent No. 3,769,281                    Dated  October 30, 1973

Inventor(s) Robert R. Chauvette

It is certified that error appears in the above-identified patent and that said Letters Patent are hereby corrected as shown below:

In column 2, line 57, the word "solvent" should be deleted.

In column 5, in the lowest structural formula, that portion of the formula depicted as follows:

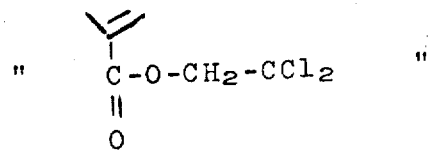

should appear as

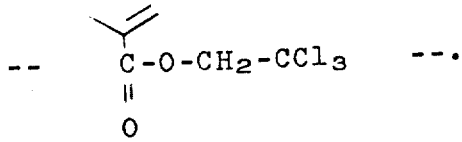

Signed and sealed this 20th day of August 1974.

(SEAL)
Attest:

McCOY M. GIBSON, JR.
Attesting Officer

C. MARSHAL DANN
Commissioner of Patents